HAMMER MILL WITH AUTOMATIC SCREEN-CHANGING MECHANISM

Filed Oct. 3, 1958 17 Sheets-Sheet 1

INVENTORS
I. J. HUMPHREY
JOHN D. HAMAKER
BY
Emory L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 2

INVENTORS
I. J. HUMPHREY
JOHN D. HAMAKER

BY Emery L. Groff Jr.

ATTORNEY

HAMMER MILL WITH AUTOMATIC SCREEN-CHANGING MECHANISM

Filed Oct. 3, 1958 17 Sheets-Sheet 3

INVENTORS
I. J. HUMPHREY
JOHN D. HAMAKER
BY
Emory L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 4

INVENTORS
I. J. HUMPHREY
JOHN D. HAMAKER

BY Emory L. Groff, Jr.
ATTORNEY

INVENTOR
I. J. HUMPHREY
JOHN D. HAMAKER
BY Emery L. Groff Jr.
ATTORNEY

INVENTOR
I. J. HUMPHREY
JOHN D. HAMAKER

BY Emory L. Groff Jr.
ATTORNEY

INVENTOR
I. J. HUMPHREY
JOHN D. HAMAKER

BY Emory L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 8

INVENTOR
I. J. HUMPHREY
JOHN. D. HAMAKER

BY Emory L. Groff Jr.
ATTORNEY

INVENTOR
I. J. HUMPHREY
JOHN D. HAMAKER

BY Emery L. Groff, Jr.
ATTORNEY

HAMMER MILL WITH AUTOMATIC SCREEN-CHANGING MECHANISM

Filed Oct. 3, 1958 17 Sheets-Sheet 10

INVENTORS
I.J. HUMPHREY
JOHN D. HAMAKER
BY
Emery L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 11

INVENTOR
I. J. HUMPHREY
JOHN D. HAMAKER

Emory L. Groff Jr.
ATTORNEY

INVENTOR.
I. J. HUMPHREY
JOHN D. HAMAKER
BY
Emory L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 13

INVENTOR.
I. J. HUMPHREY
JOHN D. HAMAKER

BY Emory L. Groff Jr.
ATTORNEY

INVENTORS
I. J. HUMPHREY
JOHN D. HAMAKER
BY Emory L. Groff Jr.
ATTORNEY

HAMMER MILL WITH AUTOMATIC SCREEN-CHANGING MECHANISM

Filed Oct. 3, 1958 17 Sheets-Sheet 15

INVENTORS
I. J. HUMPHREY
JOHN D. HAMAKER
BY Emory L. Groff Jr.
ATTORNEY

INVENTORS
I. J. HUMPHREY
JOHN D. HAMAKER
BY Emory L. Groff Jr.
ATTORNEY

Sept. 27, 1960 I. J. HUMPHREY ET AL 2,954,175

HAMMER MILL WITH AUTOMATIC SCREEN-CHANGING MECHANISM

Filed Oct. 3, 1958 17 Sheets-Sheet 17

INVENTORS
I. J. HUMPHREY
JOHN D. HAMAKER
BY Emory L. Groff, Jr.
ATTORNEY

United States Patent Office 2,954,175

Patented Sept. 27, 1960

2,954,175

HAMMER MILL WITH AUTOMATIC SCREEN-CHANGING MECHANISM

I. J. Humphrey and John D. Hamaker, Tyler, Tex., assignors, by mesne assignments, to J. B. Sedberry, Inc., Tyler, Tex., a corporation of Tennessee Filed Oct. 3, 1958, Ser. No. 765,186

18 Claims. (Cl. 241—89)

This invention relates to a hammer mill provided with a plurality of screens adapted to be selectively and interchangeably inserted into a hammer mill from a storage position adjacent the mill.

One of the objects of the invention is to provide a screen-changing mechanism which may be operated and controlled in any appropriate way, such for example as, by an electrically operated push-button control panel at a point remote from the mill, by manual means at the mill location, or by manual means from a point remote from the mill.

Another object is to provide screen-selecting and actuating means whereby a screen may be withdrawn from its working position in the mill, and another screen inserted in its place with a minimum time lag between the two operations.

Another object is to provide special camming means for assuring that the selected screen is securely seated and locked in working position in the hammer mill.

A further object is to provide a hammer mill casing with a novel arrangement of separator plates to provide a retarding action of the grain fed to the mill, and to eliminate clogging of the grain at the entrance to the grinding area.

A still further object is to provide novel air inlet control means adjacent the feed hopper of the hammer mill to permit air to be drawn into the grinding chamber by centrifugal force of the hammers and the suction of the fan regardless of the amount of material in the hopper.

A further object is to eliminate leakage of ground grain and grain dust through the main shaft openings of the grinding chamber casement by the employment of sidewall sweeps or wipers which are attached to each end of each hammer rod, on the outside of each end rotor disc. The action of these sweeps creates a suction into the grinding chamber around the main rotor shaft, eliminating leakage around the shaft opening.

With these and other objects in view, which will more readily appear as the nature of the invention is better understood, the invention consists in the novel construction, combination, and arrangement of parts, hereinafter more fully described, illustrated and claimed.

A preferred and practical embodiment of the invention is shown in the accompanying drawings, in which.

Figures 8, 9, 9A:
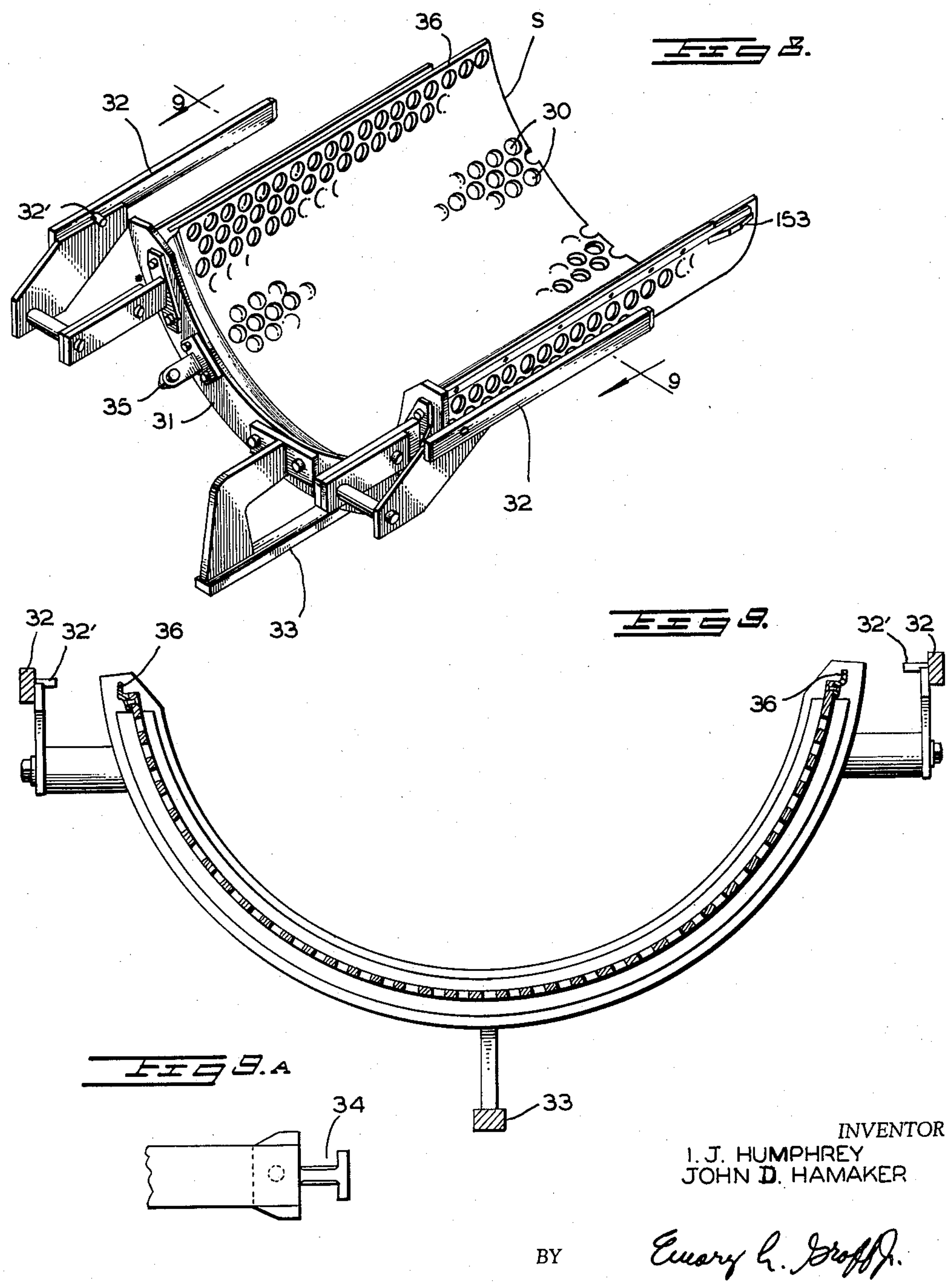
Figure 8 is a perspective view of a screen.
Figure 9 is a transverse sectional view taken on the line 9—9 of Figure 8.

Figure 9*a* is a top plan view of the head portion of the screen drag bar.

Figure 3:
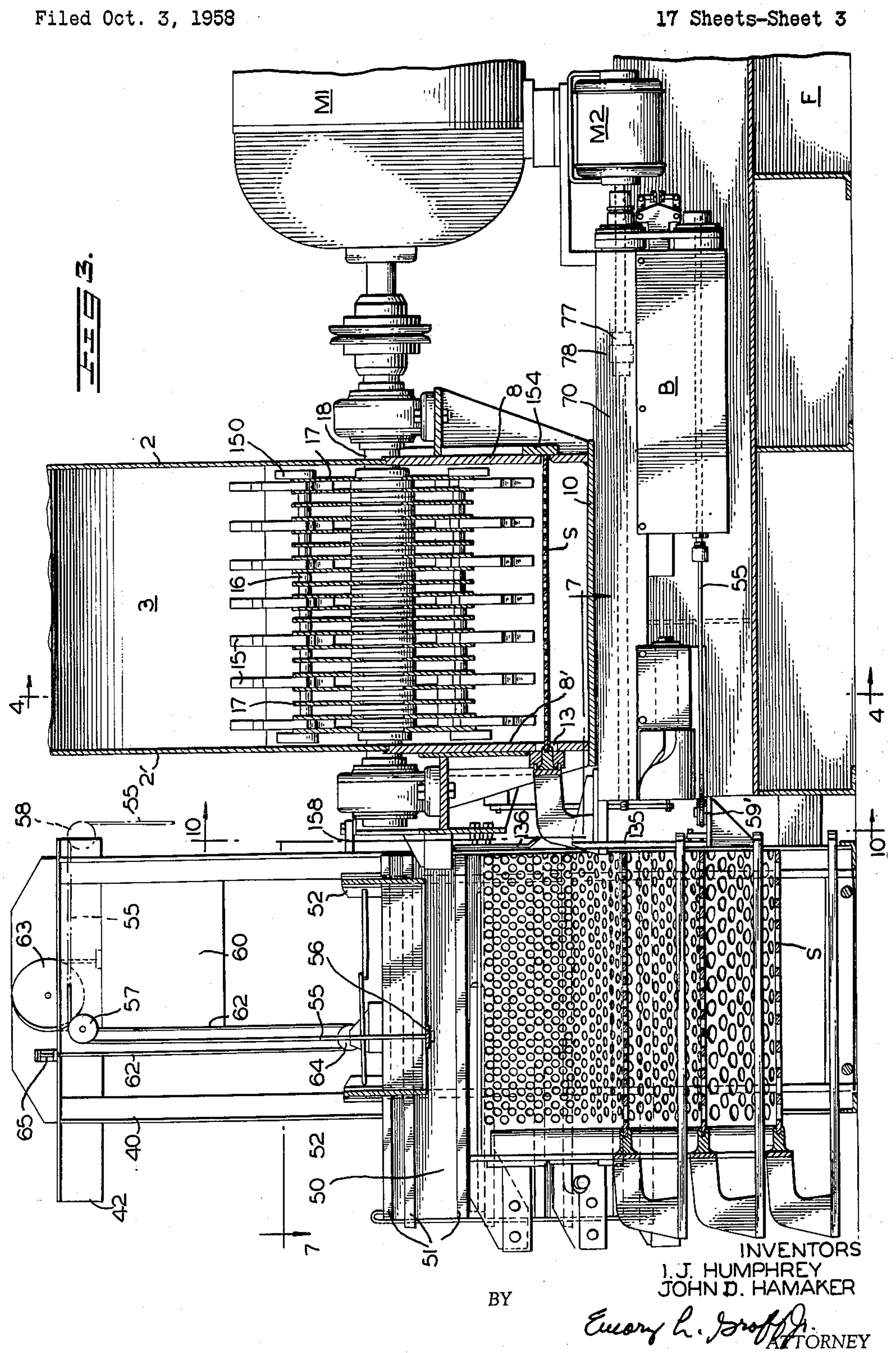
Figure 3 is a vertical sectional view taken along line 3—3 of Figure 2.
Figure 10:
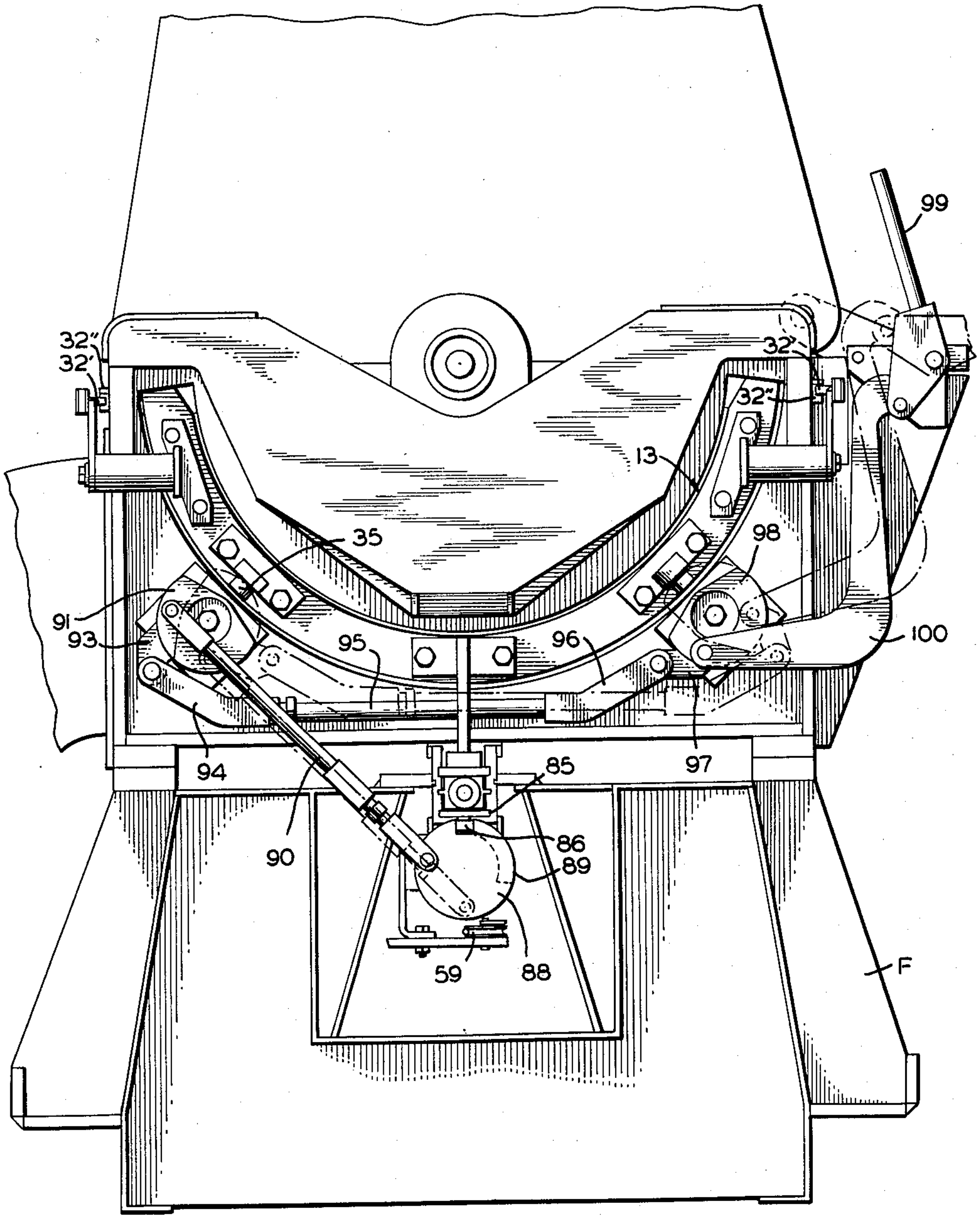

Figure 10 is an enlarged fragmentary sectional view taken on line 10—10 of Figure 3.

Figure 11:
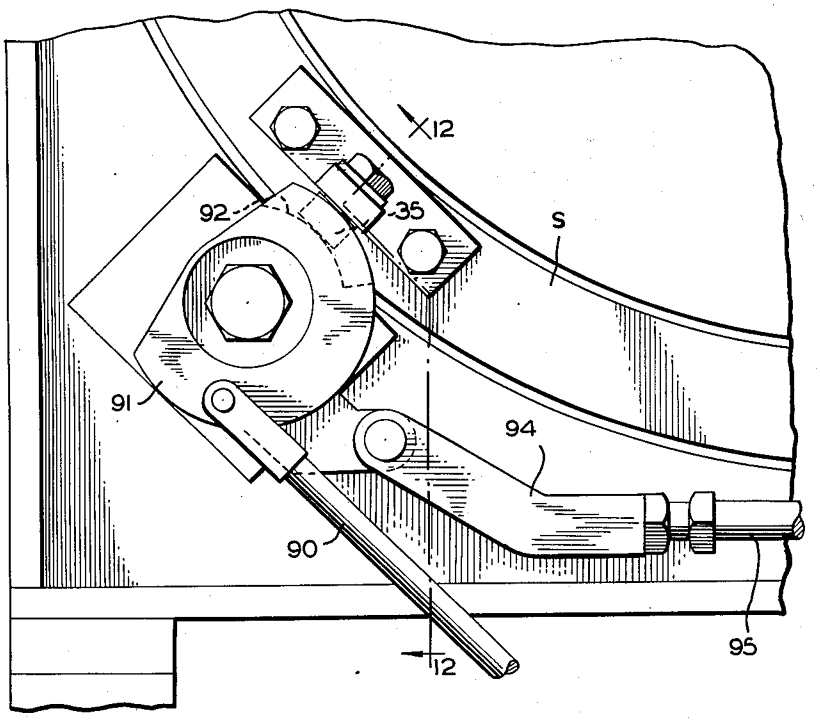

Figure 11 is an enlarged fragmentary elevational view of one of the camming or locking means shown in Figure 10.

Figure 12:
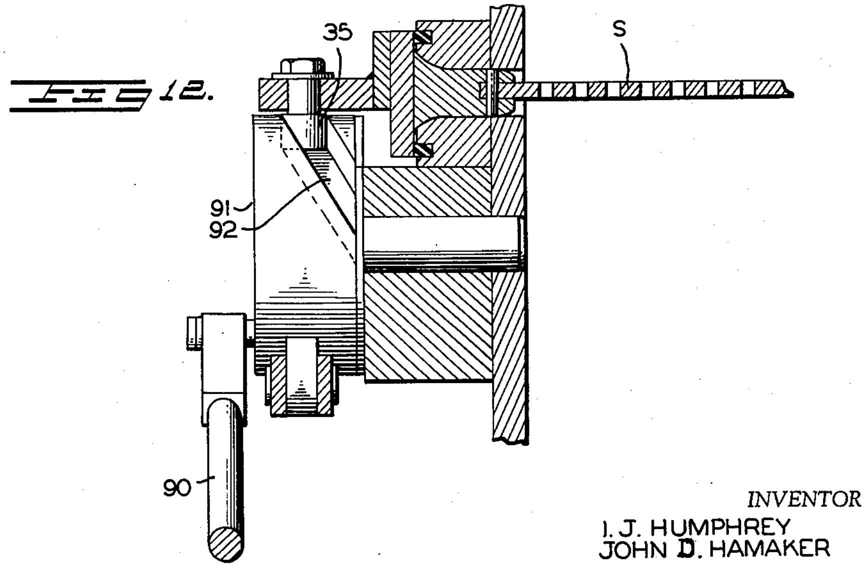

Figure 12 is a vertical sectional view taken substantially on the line 12—12 of Figure 11.

Figure 13:
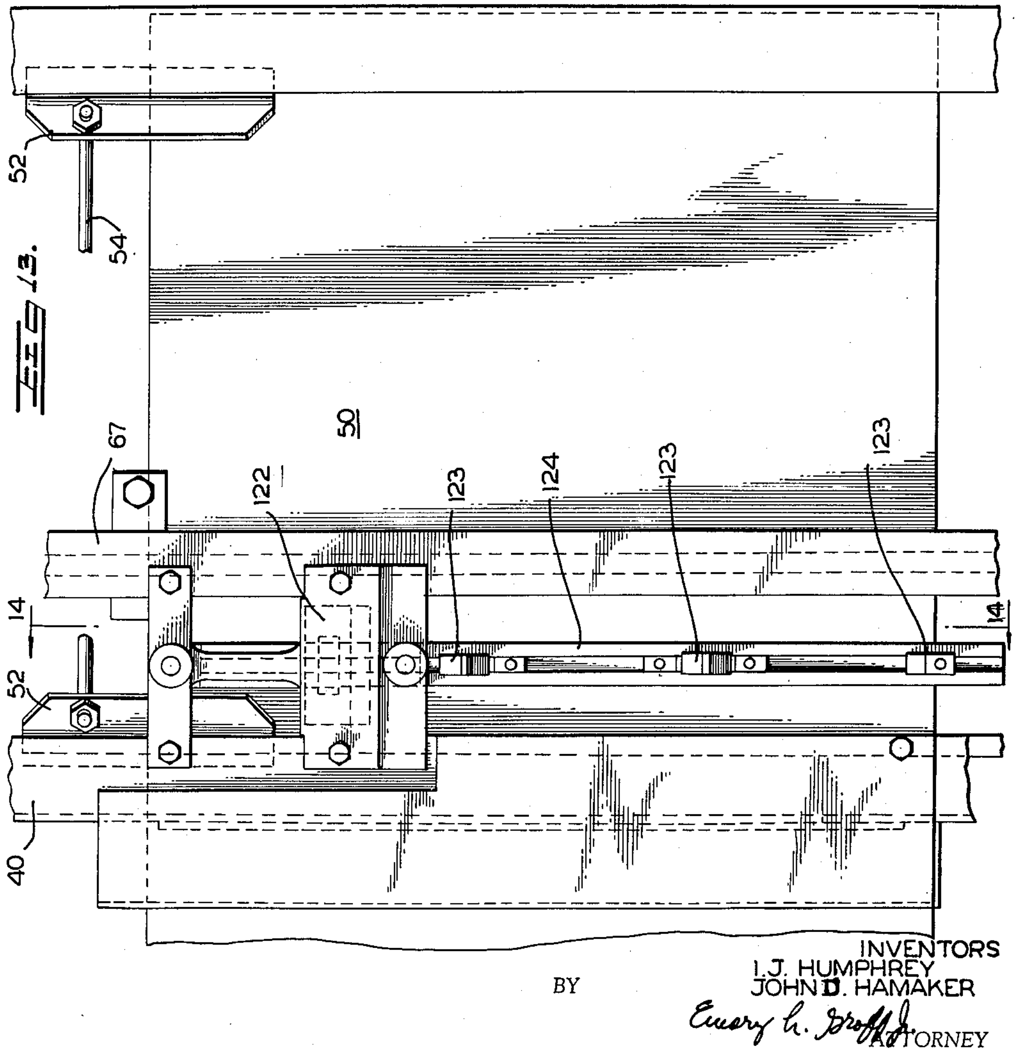

Figure 13 is an enlarged fragmentary side elevational view of the screen elevator frame and screen carriage assembly.

Figure 14:
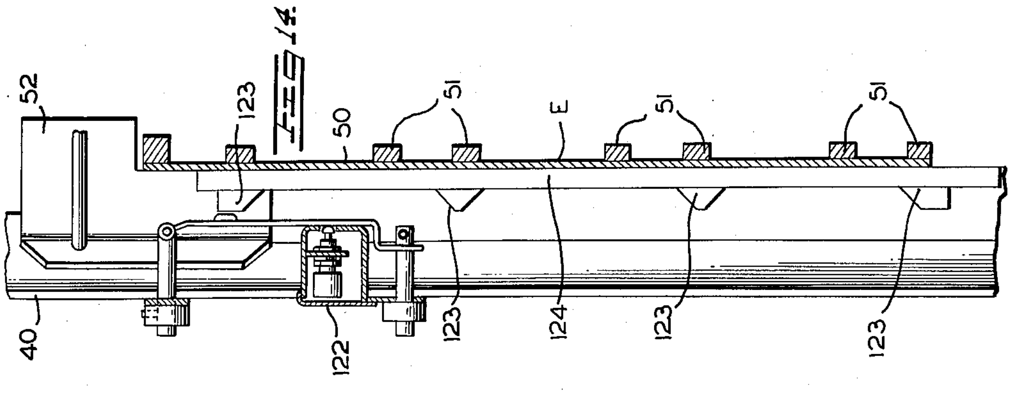

Figure 14 is a vertical sectional view taken on the line 14—14 of Figure 13.

Figure 15:
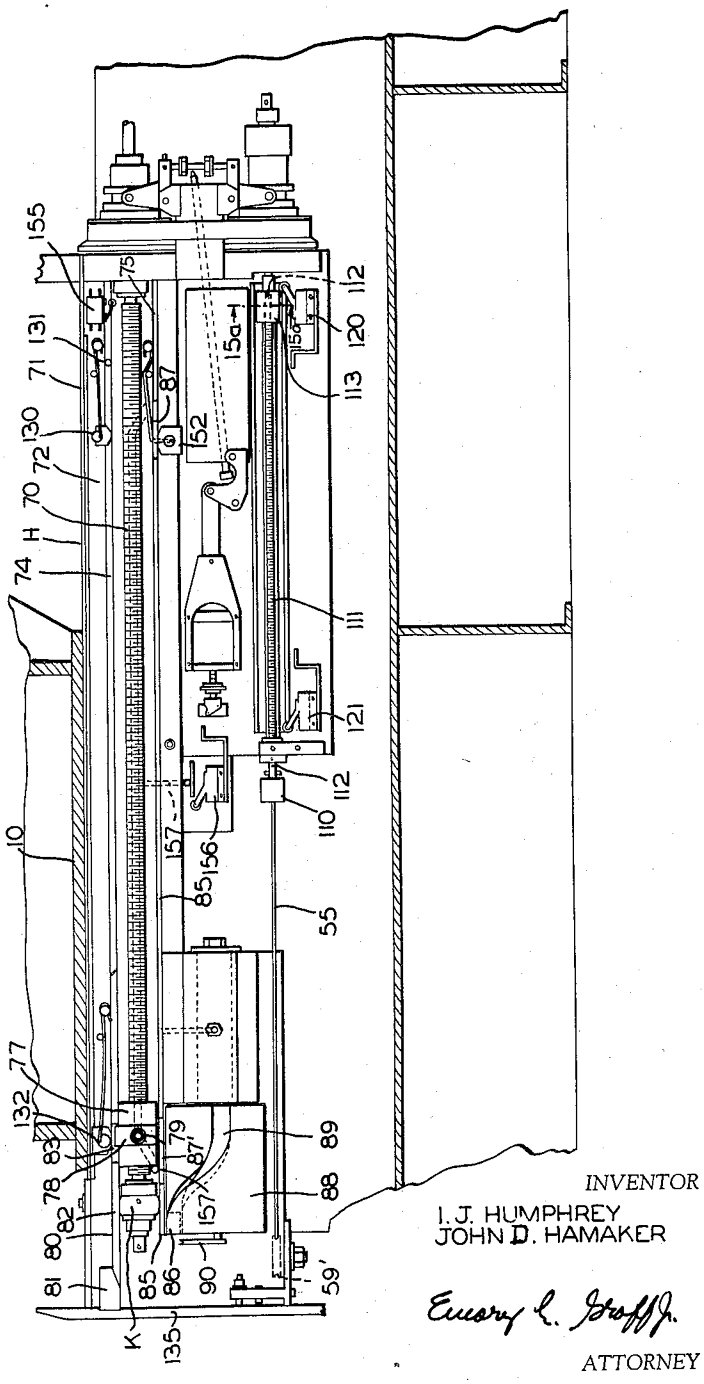

Figure 15 is a side elevation of the screen-actuating assembly.

Figure 15C:
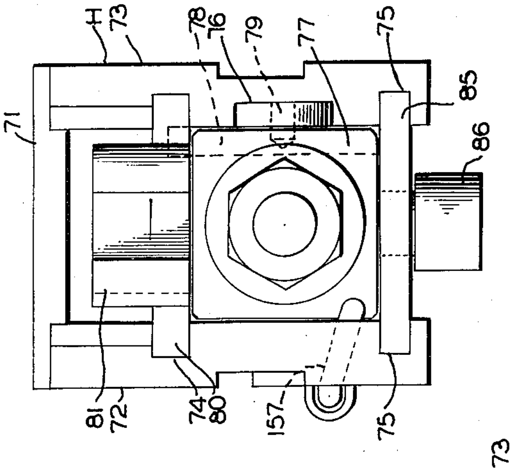
Figure 15A:
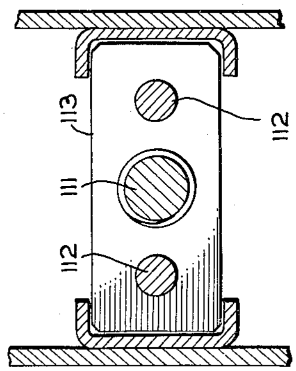

Figure 15*a* is an enlarged end view, partly in section, of the screen elevator actuating shaft and related parts.

Figure 15B:
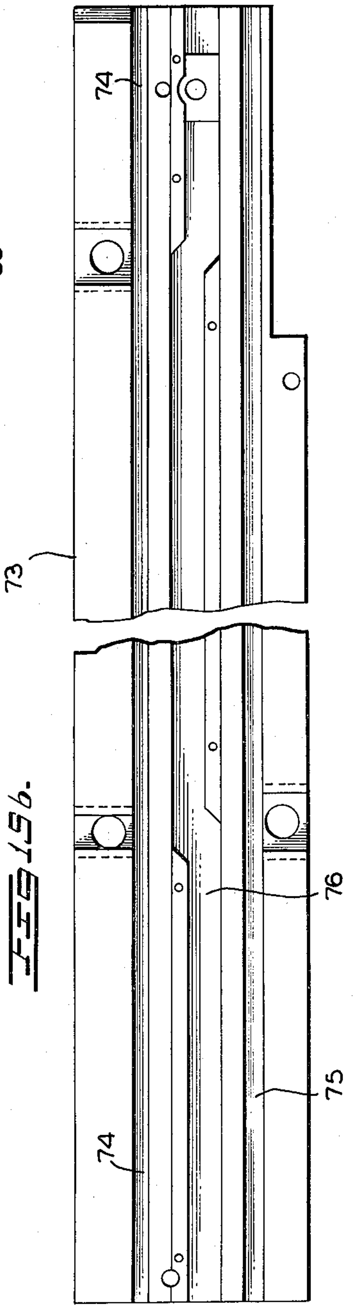

Figure 15*b* is a side elevational view of the front plate of the housing for the screen-actuating assembly.

Figure 15*c* is an enlarged end view of the housing for the screen-actuating assembly and related parts.

Figure 16:
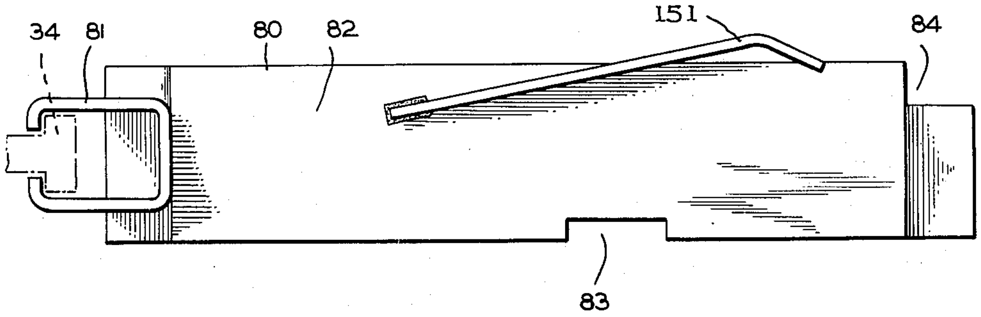

Figure 16 is a top plan view of the screen drag bar.

Figure 17:
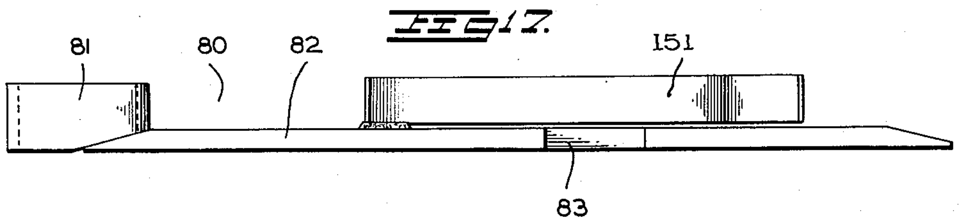

Figure 17 is a side elevation of the screen drag bar shown in Figure 16.

Figure 18:
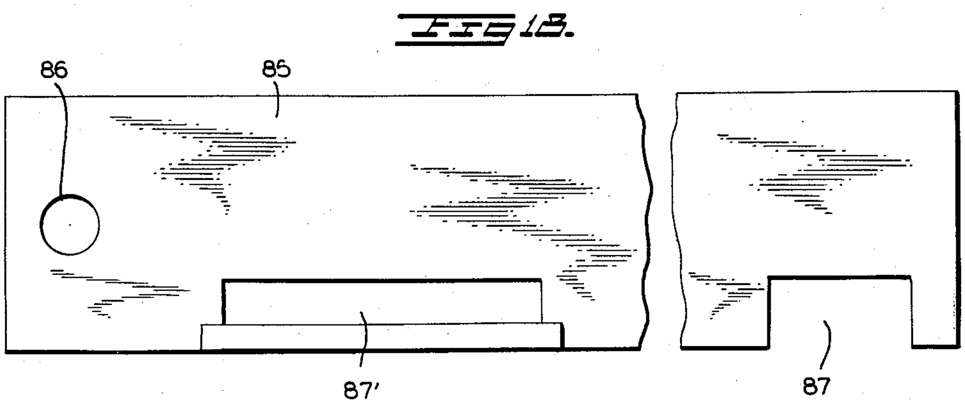

Figure 18 is a top plan view of the screen clamping bar.

Figures 19, 20:
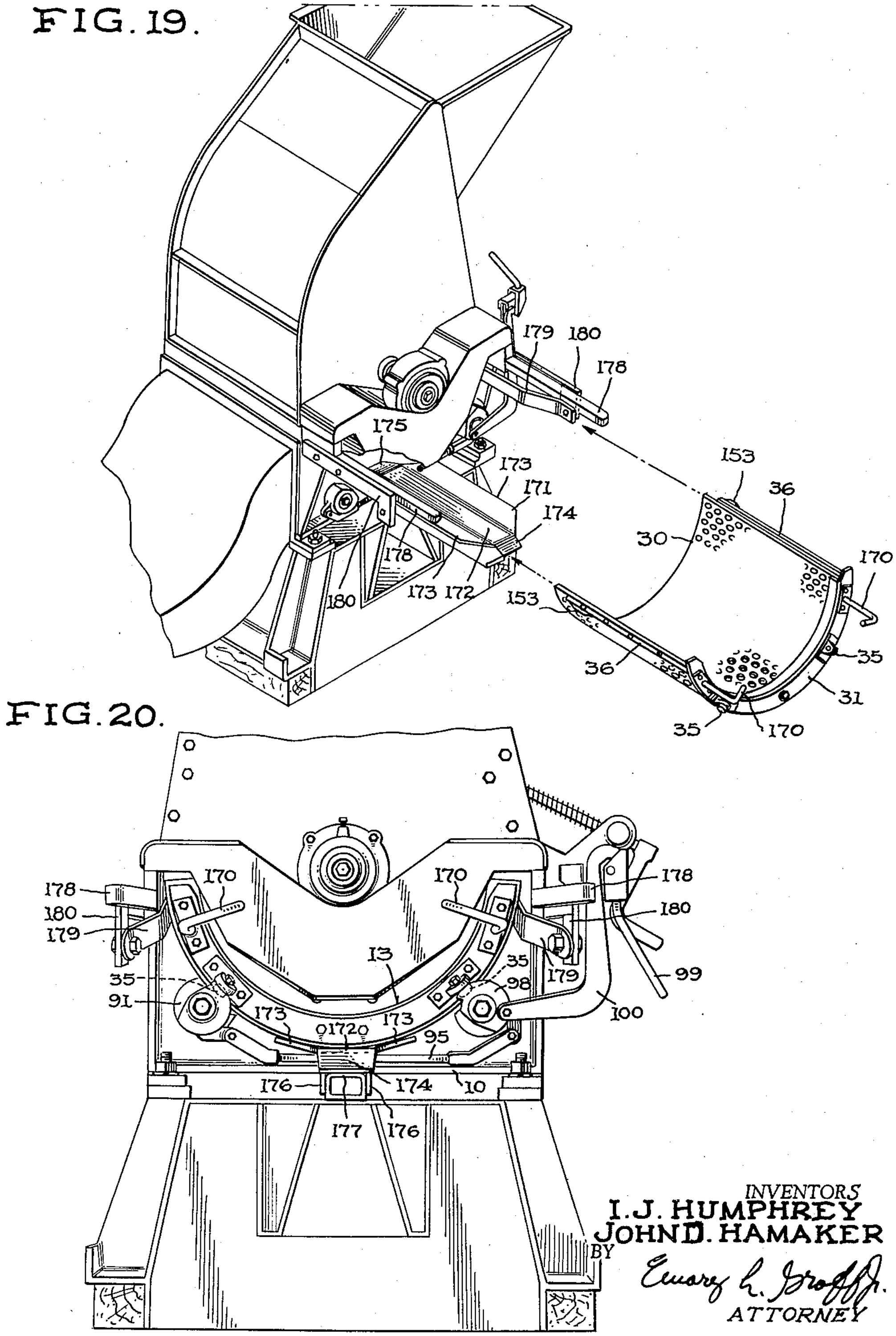

Figure 19 is a perspective view of a modification of the invention wherein the screens are manually inserted into the mill.

Figure 20 is a front elevation of the mill shown in Figure 19.

Figure 21:
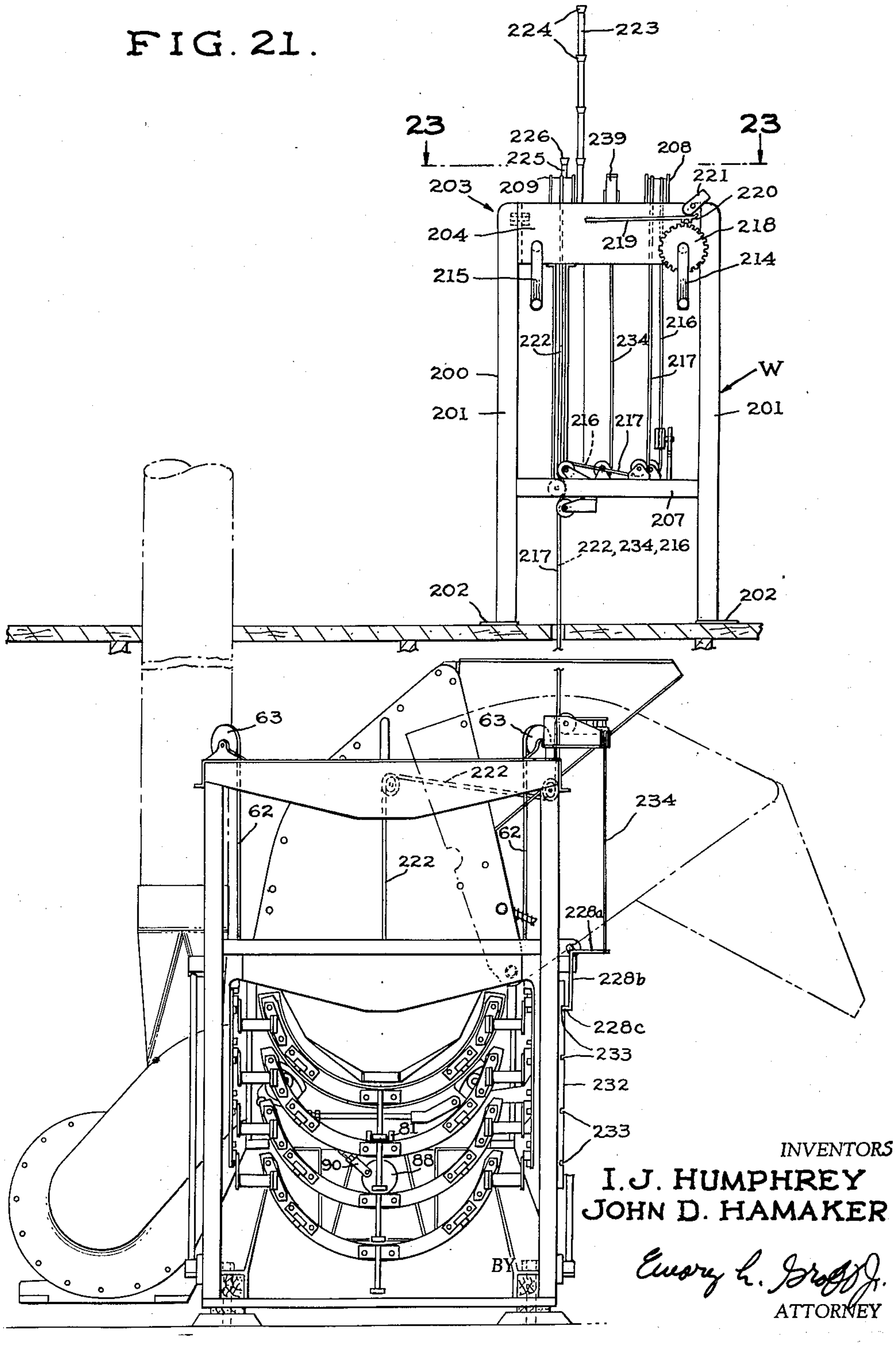

Figure 21 is a front elevation of a modification of the invention illustrating a manually controlled cable operating mechanism for selecting and inserting the desired screen into the mill.

Figure 22:
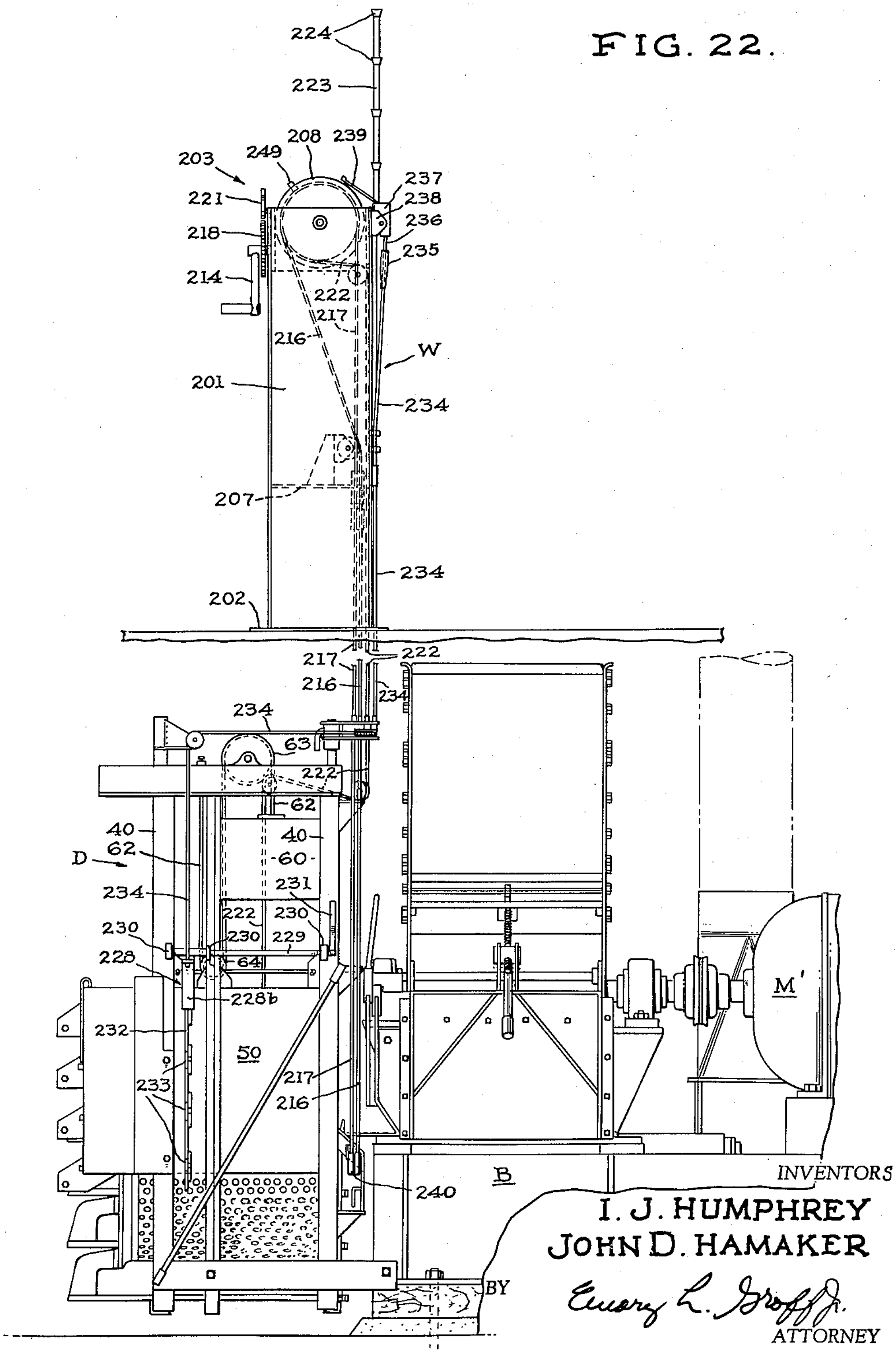

Figure 22 is a side elevation of the apparatus shown in Figure 21.

Figures 23, 24:
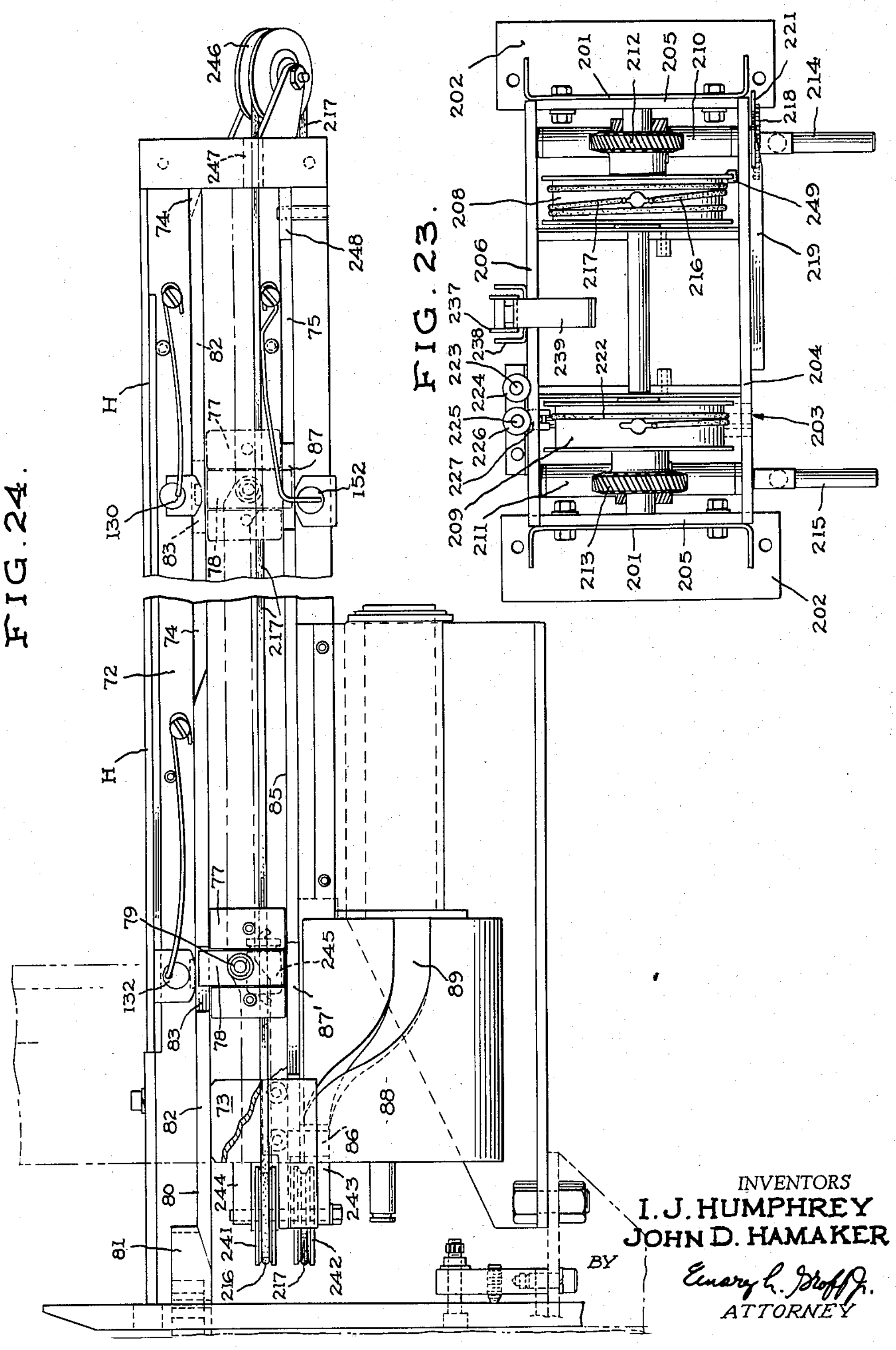

Figure 23 is a top plan view of the control station taken along the lines 23—23 shown in Figure 21.

Figure 24 is a side elevation of the screen actuating assembly employed in the modification shown in Figures 21–23.

Similar reference characters designate corresponding parts in the several figures of the drawing.

*General description*

The form of the invention comprises generally a hammer mill assembly designated as A driven by a motor M′; a screen-actuating assembly B driven by a motor $M^2$ and adapted to move a screen into and out of the mill. These units are all supported by a base F secured to the floor of the building.

Adjacent to the hammer mill assembly and the screen actuator mechanism there is located a screen carriage assembly C including a frame D and a rack E in which a plurality of arcuate shaped screens S are arranged in stacked vertical relationship.

The screen actuating assembly B includes means for raising and lowering the screen rack E to place the selected screen in aligned position to be inserted into the hammer mill; means for pulling the screen from the rack to place it in operating position in the mill; and means to lock the screen in the mill. The screen is removed from the mill and returned to the rack E by reversal of the sequence of operations necessary to insert it into the mill.

*The hammer mill assembly*

Figure 4:
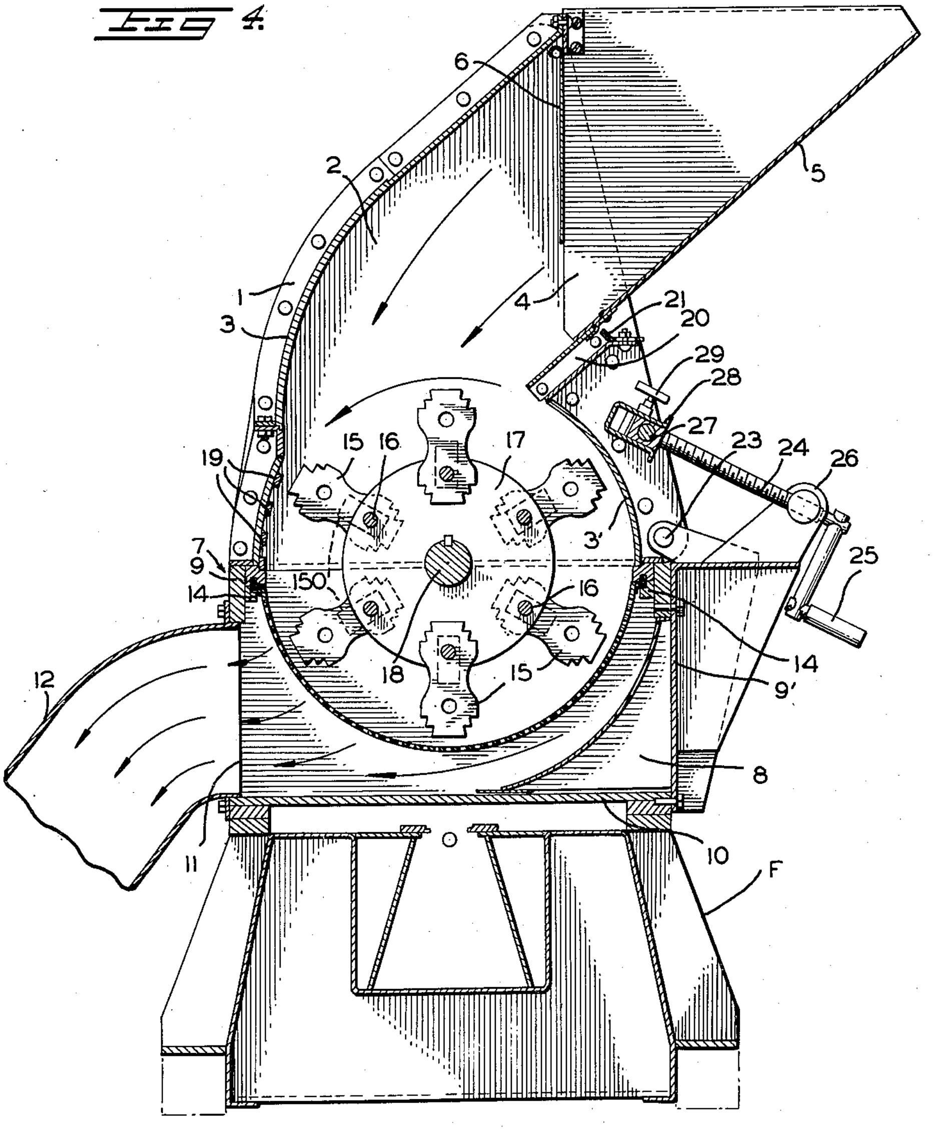
Figure 4 is a vertical sectional view of the hammer mill and feed hopper taken on the line 4—4 of Figure 3.
Figure 5:
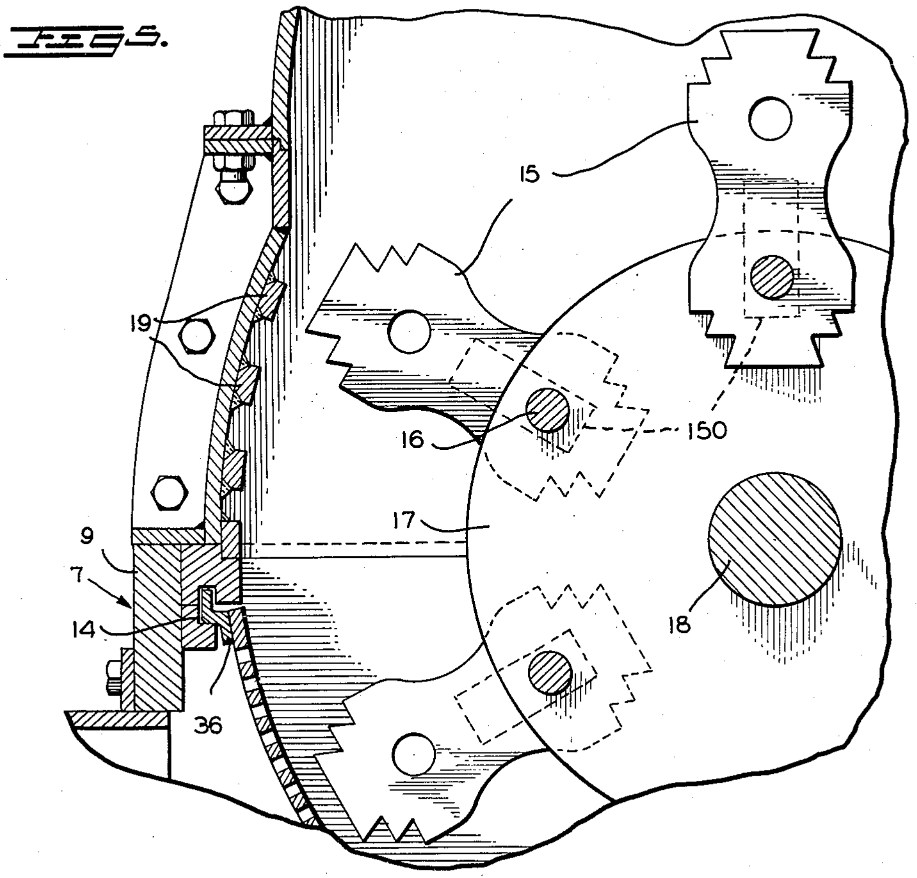
Figure 5 is an enlarged fragmentary sectional view of a portion of the comminuting chamber showing the separator plates.
Figure 6:
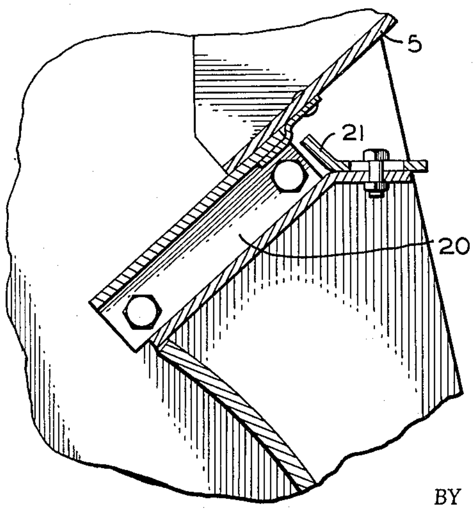
Figure 6 is an enlarged fragmentary sectional detail view showing the air inlet to the comminuting chamber and the air flow adjusting means.
Figure 7:
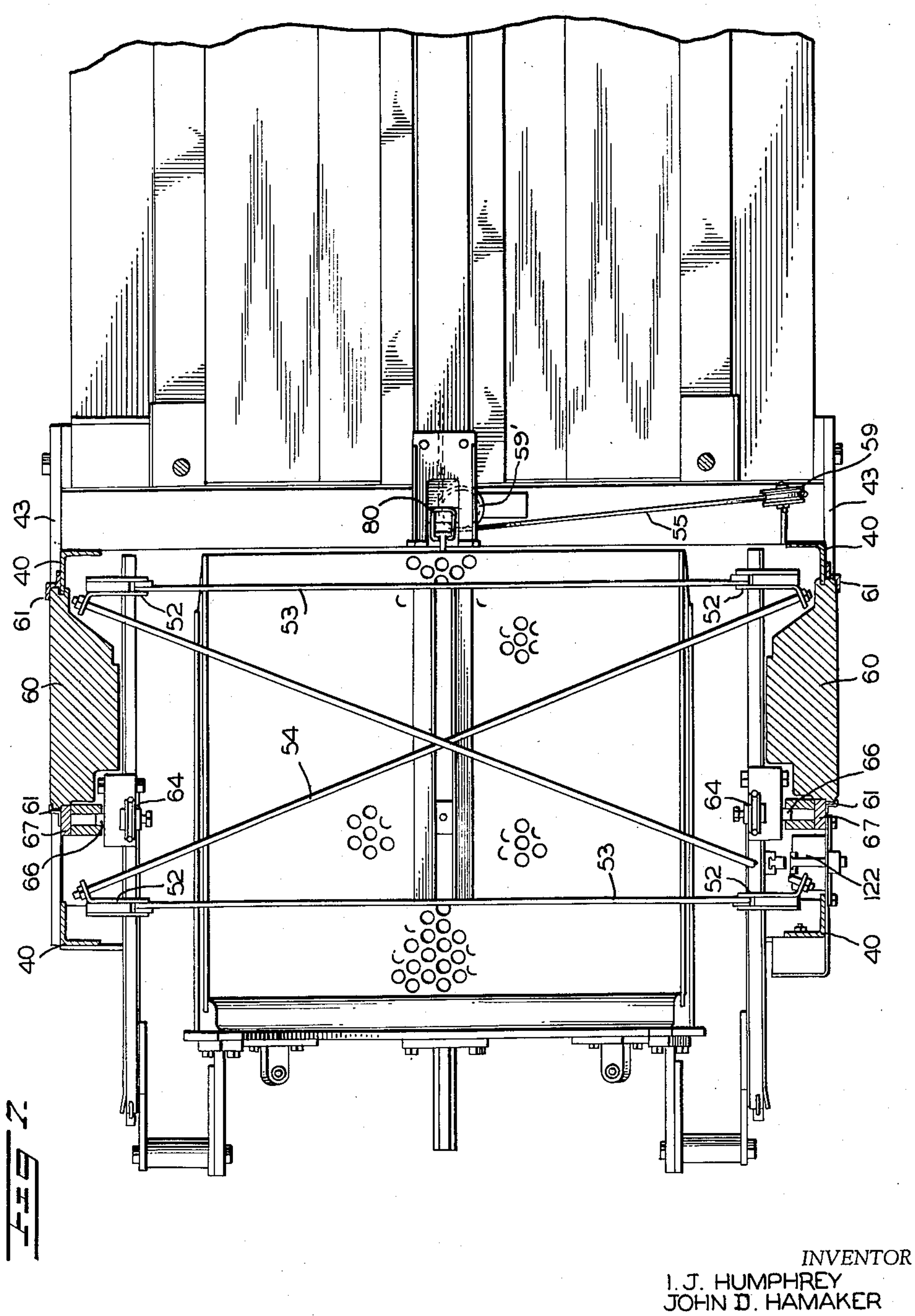
Figure 7 is an enlarged fragmentary horizontal sectional view on the line 7—7 of Figure 3.

The hammer mill assembly A as shown in Figures 3, 4 and 5, comprises generally, an upper housing 1, having end walls 2, 2', side walls 3, 3' and an open top 4. A hopper 5 is attached to the side walls 3, 3' to receive feed to be introduced into the mill. A baffle plate 6 is pivotally secured to the end walls 2, 2' within the opening 4 and adjacent the hopper 5 to provide a retarding effect on the throw-out or kick-back of the ground material from the grinding chamber. A lower housing 7 having end walls 8, 8', side walls 9, 9' and a bottom wall 10 is connected to the upper housing 1 and is provided with a material discharge outlet 11 in the side wall 9. Attached to the outlet 11 is a duct 12 leading to a motor driven suction fan (not shown) which draws the comminuted material to a conventional collector (not shown).

Figure 2:
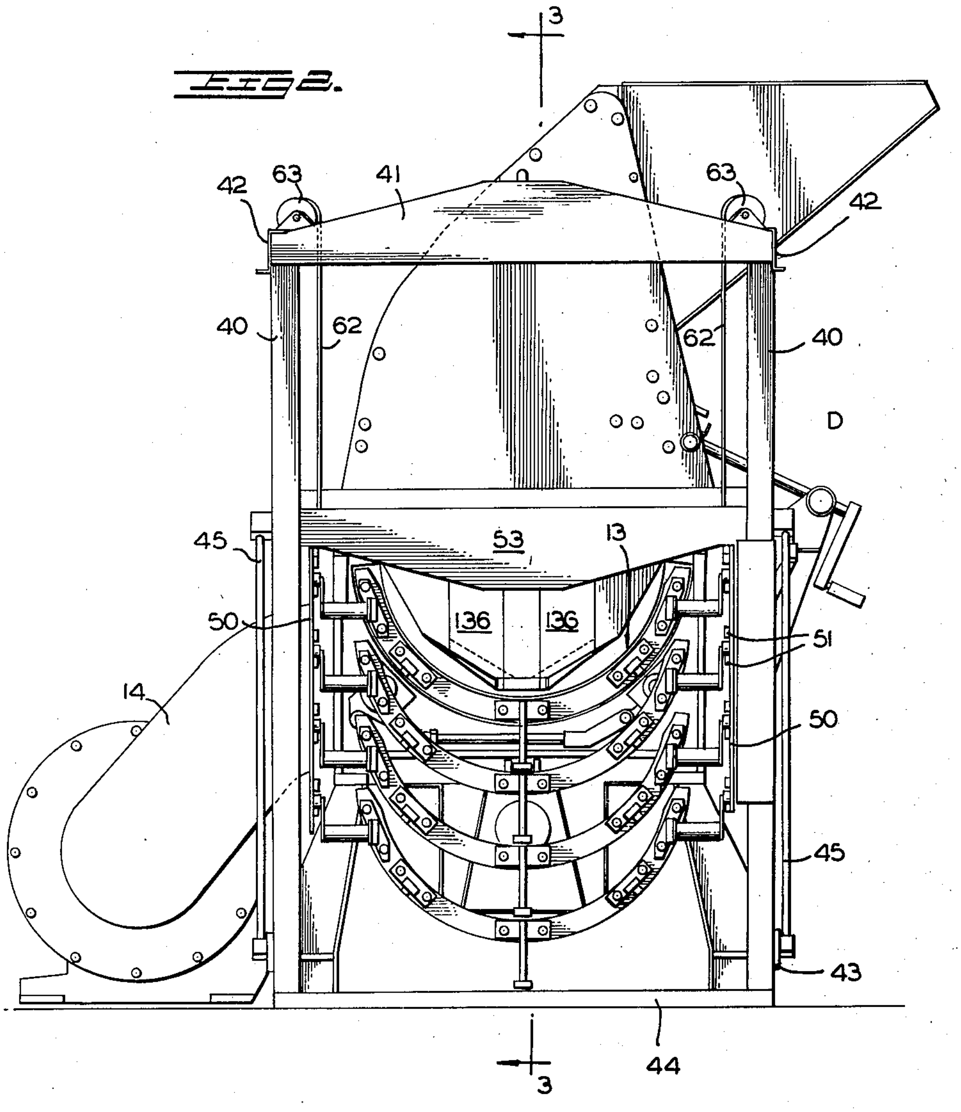
Figure 2 is an end elevational view of the screen storage rack and screen elevator.

The end wall 8' of the lower housing 7 is located adjacent the screen storage rack E and is provided with arcuate shaped opening 13 (Figures 2 and 10) of slightly larger dimensions than the screen to be inserted into the mill. To support and properly align or guide the screen S while it is entering the mill and to prevent the screen from coming in contact with the revolving hammer tips and prevent rotation of the screen, the side walls 9, 9' of the lower assembly are each provided with a pair of oppositely disposed and aligned guide tracks 14 which receive the guide bars 36, 36 of the screen for sliding movement therein. End walls 8 of the lower housing is provided with an arcuate shaped groove 154 aligned with opening 13 in end wall 8' for the purpose of receiving and supporting the leading end of screen S when the latter is locked in operating position with the mill.

Confined within the housings 1 and 7 is the hammer mechanism comprising a plurality of hammers 15 pivotally mounted on supporting shafts 16, carried by spacing plates 17 which are secured to a motor driven shaft 18 so as to rotate therewith. Wipers 150 are attached to both ends of each of the shafts 16 to create a suction into the grinding chamber around the shaft 18, eliminating leakage of grain or grain dust around the shaft opening.

On the inner surface of wall 3 of the upper housing 1, there is fixed thereto a plurality of bars 19 extending laterally of the casing. The purpose of the bars 19 is to provide further retarding action of the grain being fed to the mill, so that the grain will receive prolonged and therefore greater impact from the hammers, thus assuring a more thorough grind.

The upper housing 1 is also provided with an air inlet 20 located directly beneath the feed hopper 5. The air inlet permits a supplemental air supply to be drawn into the grinding chamber due to rotation and centrifugal force action of the hammers and the suction force of the fan. This feature permits a greater supply of air to enter the grinding chamber during the grinding operation, regardless of whether or not the hopper is full of material. The air entering the chamber through inlet 20 may be adjusted by sliding deflector plate 21 over the mouth of the inlet 20, thus providing means for controlling of the amount of air drawn in by the aforementioned operation.

In order to provide access to the lower housing 7 and the hammer mechanism, the wall 3' of the upper housing 1 is pivotally secured to the wall 9' of the lower housing by a hinge connection 23. The means for opening and closing the wall 3' and locking it in open and closed position comprises, a threaded crankshaft 24 provided with a handle 25. The crankshaft threads are engaged in rotatable threaded nut 26, carried by wall 9' of lower housing 7. The inner end of crankshaft 24 is rotatably journalled and is engaged with a pinned collar 27, mounted in a casing 28, fixed to the upper housing 1. In order to lock the crankshaft in any desired position, there is provided a threaded shaft 29, passing through a tapped opening in the casing 28, to selectively engage the outside surface of collar 27.

*The screen assembly*

Figures 8, 9 and 9*a* of the drawings illustrate a typical screen S of arcuate shape provided with a plurality of openings 30. Each of the screens is provided with openings of different diameter, depending on the fineness of the grind desired.

The screen is further provided with a back plate 31, having affixed thereto a pair of forwardly projecting arms 32, 32, which support the screen in the screen storage rack E when it is not in use in the mill. As a means of accurately guiding the screen into the mill through opening 13 in end wall 8', each of said arms 32 is provided with pins 32', 32' extending inwardly towards the body of the screen. Said pins are adapted to ride on the upper surface of guides 32'', 32'' secured to the exterior of side walls 9, 9' of the lower housing. Also, attached to the center of the back plate 31 and depending therefrom is an injector bar 33 extending medially of and spaced from the bottom surface of the screen S. The bar 33 is of sufficient length so as to extend slightly beyond the forward edge of the screen. The free end of the bar has a T-shaped head portion 34 as shown in Figure 9*a* to cooperate with a screen drag bar forming part of the screen-actuating means, to enable the selected screen to be drawn into the mill. The back plate 31 also has mounted thereon and equally spaced on opposite sides of the injector bar mounting, a pair of cam rollers 35, 35, the purpose of which is to cooperate with a camming mechanism forming part of the screen-actuating means to urge the selected screen to its final seated working position and lock the screen securely in the mill. The details of injecting the screen into the mill and locking it in working position will be later described.

As previously indicated, on each side of the screen at the upper forward edges there are provided guide bars 36, 36 adapted to slide in the tracks 14 of the lower housing 7 of the mill, which guide and support screen S while entering the mill. After screen S is properly locked in mill, it is supported entirely by back plate 31, in groove 13 of end wall 8' and far end of screen in groove 154 of end wall 8 (Figure 3). Guide lugs 153 on screen S, Figure 8, are for alignment purposes when screen begins to enter slot or groove 13.

*The screen carriage assembly*

Referring particularly to Figures 2, 3, 7, 13 and 14, the screen carriage assembly comprises generally a supporting frame D and a screen rack E mounted for vertical movement in the frame.

Figure 1:
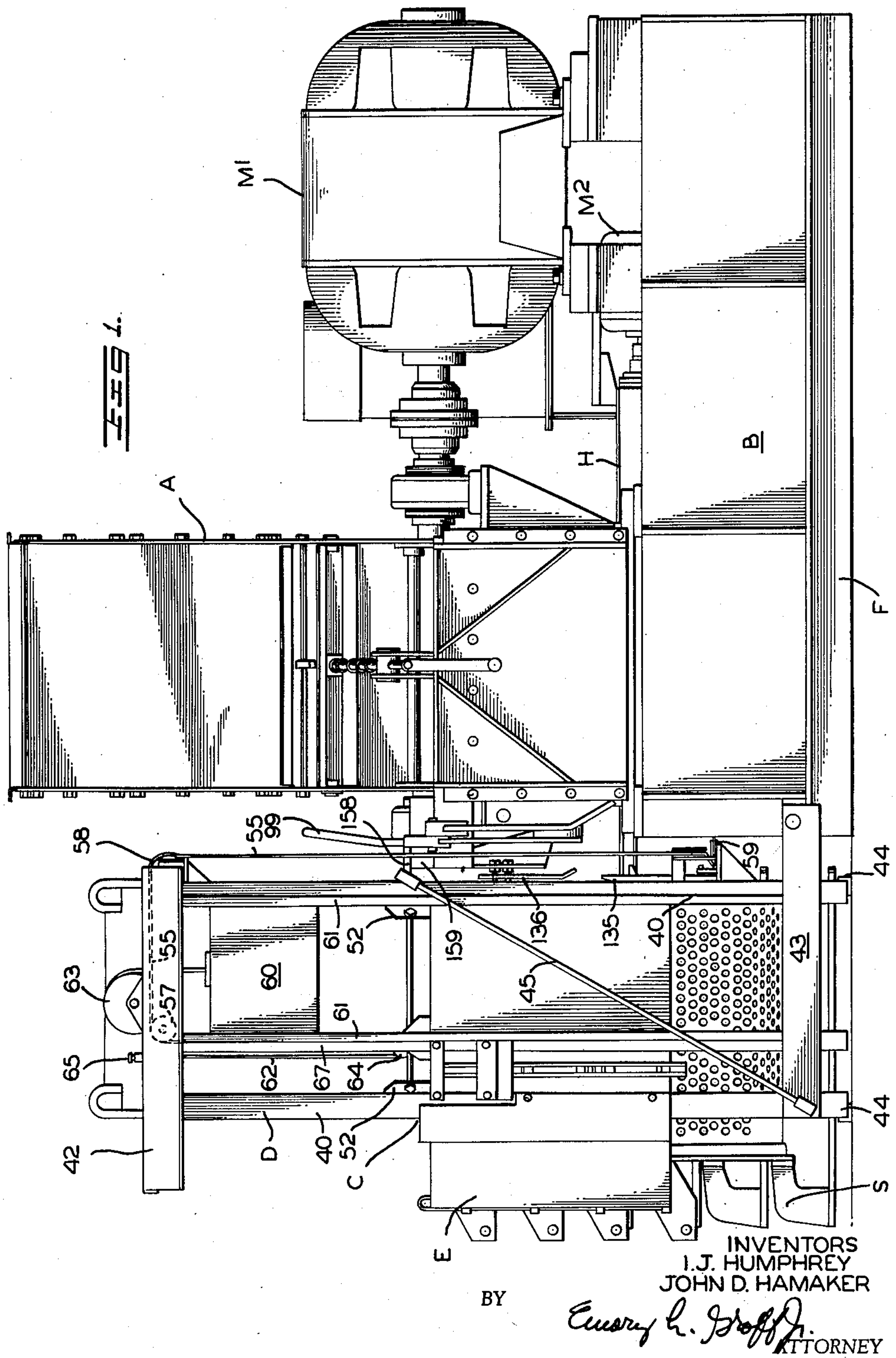
Figure 1 is a side elevational view showing the screen rack and elevator mechanism, the hammer mill and the casing enclosing the screen-actuating mechanism in their assembled relationship.

The frame D comprises generally four vertical corner posts 40 connected together at their tops by horizontal beams 41, 42 and at the bottom by horizontal beams 43, 44. The entire frame D is a rigid jig-fitted unit which is properly aligned and fitted to the hammer mill in the following manner: Beams 43, 43 have reamed holes which are fitted to corresponding reamed holes in base F and tied with bolts. Plate 158 is welded to the corner posts 40 and is bolted or otherwise attached to the pillow block bracket 159, thus providing means for securing frame D to the hammer mill assembly A. Additional rigidity is imparted to the frame D by use of tie rods 45 (Figures 1 and 2) connecting opposite corner posts 40.

The screen rack E (Figures 2, 3 and 7) consists of a pair of opposed side plates 50 each provided on their inner faces with a plurality of pairs of guide rails 51 which receive and support arms 32 of the screen S. The side plates 50 are bolted or otherwise attached at their upper ends to angle members 52 which are in turn connected to a pair of beams 53. Tie rods 54 connect diagonally opposite angle members 52 to provide strength and rigidity for the rack structure.

The vertical movement of the rack E in the supporting frame is accomplished by the actuation of a cable 55 having one of its ends connected at 56 to the top center of the screen rack E and passing around pulleys 57, 58, 59 and 59' to a driven rotatable member of the screen actuating assembly B to which its other end is attached (see title "Raising and Lowering Screen Rack").

To assist the screen rack in its up and down movement, a pair of counter-weights 60 (Figs. 3 and 7) are slidably mounted in guide channels 61 fixed to the posts 40 adjacent the hammer mill assembly and screen rack guide tracks 67. Cables 62 are attached to the top of each counterweight and pass over angularly disposed pulleys 63 mounted on beams 42, around pulleys 64 mounted on the upper edge of the side plates 50 of the screen rack E, and are attached to beams 41, 42 by means of anchor members 65.

The screen rack E is held in vertical alignment during its up and down movement by guide lugs 66 mounted on each of the side plates 50 thereof which are adapted to slide within the vertical, inwardly facing, channel type guide tracks 67 connected on each side of the frame D to side beams 42, 43.

*The screen-actuating assembly*

The component parts of the screen-actuating assembly B perform the multiple functions of (I) raising and lowering the screen rack E to the proper level preparatory to insertion of an individual screen into the mill through the screen opening, (II) dragging the selected screen into the mill, (III) actuating special camming means adjacent the arcuate screen opening in the mill so as to force and lock the selected screen into seated position in the mill for the grinding operation, and (IV) ejecting the screen from the mill and returning it to its place in the screen rack when a change of screens is desired.

*Raising and lowering the screen rack*

The screen rack E is raised and lowered by means of a cable 55 having one of its ends connected at 56 to the top center of rack E, the cable passing around pulleys 57, 58, 59 and 59' to a yoke 110 (Figure 15) to which its other end is secured. The yoke 110 is actuated by a threaded rotatable shaft 111 upon which is mounted an internally threaded nut 113. A pair of pull rods 112, 112 (Figure 15) are each connected at one of their ends to the yoke 110 and at their opposite ends to the nut 113, thus forming a connection between the cable 55, the yoke 110 and the nut 113 so that rotation of shaft 111 causes nut 113 to move along said shaft and imparts movement to said cable to raise and lower the screen rack.

When the rack is elevated by electrical means from a remote control panel, the power for driving shaft 111 is derived from motor $M^2$ and controlled through appropriate clutch and brake means. The inner and outer limits of travel of nut 113 are defined by its actuation of limit switches 120, 121, located adjacent opposite ends of shaft 111 in the path of travel of the nut.

Referring to Figures 13 and 14, the vertical positioning of the selected screen for insertion into the mill is controlled by a limit switch 122 mounted on corner post 40 and guide track 67, said switch being actuated by trip lugs 123 mounted on bar 124 carried by the side wall 50 of the vertically movable rack E.

Referring to Figures 15, 15*b* and 15*c*, the drive means for dragging the screen into the mill and locking it therein is enclosed within a casing H and includes a horizontally disposed, externally threaded shaft 70. One end of the shaft is connected to and rotatably driven by the aforesaid reversible motor $M^2$ while the opposite end is mounted in a suitable bearing block K. The casing H comprises a top wall 71, a rear wall 72, and a front wall 73. The rear and front walls are both provided on their inner faces with longitudinally extending upper grooves 74 and longitudinally extending lower grooves 75. In addition, the inner face of the front wall 73 is provided with a recessed stepped track 76 (Figure 15*b*) located intermediate the said upper and lower grooves.

An internally threaded nut 77 is mounted or supported on the shaft 70 for longitudinal travel thereon and carries on one side thereof, namely, the side adjacent the front wall 73, a vertically slidable coupling bar 78 having a roller 79 rotatably mounted on its outer face. As the nut 77 travels on shaft 70, the roller 79 rides in the stepped track 76 for a purpose to be later described.

*Means for dragging a selected screen into the mill*

A screen drag bar 80 (Figures 7, 15 and 16) having a a claw shaped head 81 and a substantially flat body portion 82 is slidably mounted in the upper grooves 74 of the housing H, thereby lying in a position directly above the threaded shaft 70 and the nut 77.

In the side of the screen drag bar 80 which rides in groove 74 of front wall 73 of the casing, there is provided a notch 83 adapted to receive coupling bar 78. The rear end of the screen drag bar 80 has a tapered surface and on the side adjacent the rear wall 72 a notch 84 is provided.

The lower grooves 75 of the casing H are adapted to support for sliding movement therein a screen clamping bar 85 (Figure 18) of substantially flat rectangular shape. The front end of the bar 85 is provided with a roller 86 depending therefrom, whereas the side which rides in groove 75 of front wall 73 is provided adjacent its rear end with a notch 87 adapted to receive coupling bar 78 during the operation of locking the screen in the mill. Adjacent the forward end of bar 85, a second notch 87' is provided to receive coupling bar 78 in its downward travel after the screen has been unlocked and ejected from the mill. Further reference is made to the aforesaid elements under the heading "Operation."

*The camming means forcing and locking the screen into seated position in the mill*

Referring to Figures 10 and 11, it will be seen that directly beneath the screen clamping bar 85, at the front end of the assembly, there is located a rotatable drum cam 88 provided with a spiral, peripheral groove 89 therein. Roller 86 rests in groove 89 so that longitudinal movement of drag bar 85 causes the roller to follow the path of groove 89 and impart rotational movement to the cam 88.

The outer face of the cam 88 has attached thereto, one end of a shaft 90, at approximately 90° from the entrance of groove 89. The opposite end of the shaft 90 is eccentrically connected to a cam 91 which is provided with a diagonal peripheral groove 92 (Figure 12) adapted to receive roller 35 of screen S. Link 93 is secured to cam 91 at one end and at its other end it is pivotally connected to a yoke 94 adjustably mounted on a tie rod 95. A similar yoke 96 is fixed to the opposite end of tie rod 95 and pivotally secured to a link 97 attached to cam 98.

In order to provide means for manually forcing the screen into seated, locked position in the mill, a hand operated lever 99 is pivotally anchored to the mill housing and is also pivotally connected to one end of a bell crank lever 100. The other end of lever 100 is attached to cam 98 by the same bolt which connects link 97 to said cam. With this arrangement, it is possible to operate the screen camming means independently of the motor $M^2$ should manual operation become desirable or necessary.

For electric automatic operation of the locking and camming of screens, it is necessary that the lower end of bell crank lever 100 be disconnected from cam 98.

For manual operation of the locking and camming of screens into the hammermill with automatic screen change mechanism, in case of mechanical or electrical failure of actuator B, it is necessary that shaft 90 be disconnected and removed from drum cam 88 and cam 91, Figure 10. It is also necessary to remove injector bar 33 from screen S (Figures 8 and 9) or, alternatively, remove screen actuating assembly B from the mill.

When the manual screen operation is used, cable 55 should be disconnected and removed from screen rack E. This will allow screen rack E to assume its lowest position since the combined weight of all screens plus rack E will overcome counterweight 60.

It is also necessary that each selected screen be inserted into the mill from the top set of tracks in rack E. Screens S must be shoved toward the mill to a point that grooves 92 in cams 91 will engage rollers 35 on screen S. At this point, screens are locked into mill by applying pressure to handle 99 (Figure 10). As pressure is applied to handle 99, bell crank 100 moves cam 98, tie rod 95 and cam 91, engaging rollers 35 on screen S, locking it into position under pressure.

*Operation*

As previously mentioned, the screens can be manually inserted and locked into the mill in the event of mechanical or electrical failure of the actuator. The sequence of operation to be described here is applied to electrical operation.

The rack E in which screens S are slidably mounted is elevated, so that the selected screen is in position to enter mill A through related opening 13 in the end wall 8′ by rotation of shaft 111 causing nut 113 to travel inwardly or outwardly along the shaft. The in and out movement of nut 113 results in raising or lowering of screen rack E, since cable 55 attached at one end to the top of the rack is connected at its other end to yoke 110 and yoke 110 is connected to nut 113 by bars 112.

With the selected screen S properly aligned with opening 13 and the T-shaped head 34 of the screen injector bar 33 positioned within the claw shaped head 81 of screen drag bar 80, the shaft 70 is rotated so as to cause nut 77 to move to the right in Figure 15. As the nut 77 begins to travel, roller 79 attached to coupling bar 78 rides upwardly in track 76, causing coupling bar 78 to enter notch 83 in screen drag bar 80. As the nut 77 continues to move to the right with its coupling bar 78 engaged with drag bar 80, the screen S is drawn into the mill within a distance of approximately 13/32″ of its full travel. At this point roller 79 rides downwardly in track 76, causing coupling bar 78 to drop out of notch 83 thus disengaging the drag bar 80 from the nut 77. To provide frictional drag for the drag bar 80 to prevent it from creeping when coupling bar 78 is momentarily disengaged, a spring arm 151 (Figures 16 and 17) is secured to the upper surface of body 82 of bar 80. The free end of arm 151 extends beyond the edge of body 82 adjacent wall 72 so as to engage said wall and provide the necessary frictional drag. As the coupling bar moves downwardly spring pressed key 130 falls into notch 83 and drag bar 80 moves approximately 1/16″ beyond the point of release of coupling bar 78 and its movement is stopped by notch 84 abutting spring pin 131. The function of key 130 is to prevent the possibility that frictional drag of nut 77 against the bottom of drag bar 80 would displace the drag bar so that coupling bar 78 could not re-enter notch 83 when the screen is moved out of the mill.

After releasing the drag bar 80, the nut 77 continues to travel on shaft 70 and coupling bar 78 moves downwardly into notch 87 on the rear end of screen clamping bar 85, thus connecting nut 77 thereto. As coupling bar 78 moves downward engaging notch 87 on rear end of clamping bar 85, key 152 which has held clamping bar in fixed position is displaced by the movement of coupling bar 78. This action frees clamping bar 85 for movement. As the nut 77 travels further along shaft 70, roller 86 on the opposite end of clamping bar 85 riding in track 89 of drum 88 causes the drum to rotate which in turn rotates cams 91, 98 through members 90, 93, 94, 95, 96 and 97. Rollers 35 mounted on the back plate 31 of the screen S are caused to follow in grooves 92 of the cams, thus urging the screen all the way into the mill and locking it therein. As nut 77 continues on, it contacts limit switch 155, shutting off power to motor $M^2$ which in turn stops movement of nut 77.

The screen is moved outwardly by reversing the direction of rotation of the shaft 70 which causes nut 77 to travel to the left in Figure 15. When traveling in this direction coupling bar 78 carries screen clamp bar 85 a sufficient distance to rotate drum 88 in a reverse direction so as to release cams 91 and 98 and free the screen in the mill. The roller 79 mounted on the side of coupling bar 78 then moves upwardly in track 76. The upward movement of coupling bar 78 displaces spring pressed key 130 from notch 83 of drag bar 80 and allows spring pressed key 152 to fall in notch 87 of screen clamp bar 85.

Screen drag bar 80 is free to move while screen clamp bar 85 is locked into position by spring pressed key 152. Nut 77 is now connected to screen drag bar 80 by engagement of coupling bar 78 in notch 83 of screen drag bar and its movement to the left pushes screen S out of the mill and into its aligned tracks 51 in rack E. Nut 77 continues on until it contacts limit switch trip rod 157 which protrudes through slotted hole in sidewall 72 at left hand end. As nut 77 contact trip rod 157, its movement causes the shoe end of trip rod to contact limit switch 156 (near center, Figure 15) shutting off power to motor $M^2$ which stops movement of nut 77. The outward movement of screen drag bar 80 is stopped by coupling bar 78 moving downwardly on track 76, thus disengaging itself from notch 83.

As coupling bar 78 moves out of the notch 83, it travels downwardly into notch 87′ in the forward end of clamp bar 85 and spring pressed key 132 then moves in to notch 83 and locks the bar 80 against further movement due to its momentum.

The ejected screen has now been returned to the rack E and another screen may be inserted in the mill by raising or lowering the rack so that the desired screen is aligned with the opening in the mill.

In case the injected screen is not in vertical alignment with the other screens in the rack, it will be placed in proper alignment when the rack E is elevated or lowered by the lower edge of screen S striking the tapered edges of guide bars 136 attached to the lower half of hammer mill A or guide bars 135 attached to frame D adjacent the mill.

*Manual screen change hammer mill*

This unit consists of the same mill, base and fan system which has been previously referred to. It is a side manual screen change mill; that is, the screens may be changed manually by the operator at the side of the mill while the mill is operating. However, it is necessary to stop the flow of material which is being fed into the mill as the case in other models.

Referring to Figures 19 and 20, the screen assemblies for this mill differ from the type used in the electrically operated and cable operated models in that they do not carry projecting arms 32—32, nor injector bar 33, all of which are attached to back plate 31, as shown in Figures 8 and 9. In lieu of the 32—32 guide arms, there are provided two handles 170, 170 which are used to manually inject and eject the screen into and out of the mill.

As a means for supporting the screen prior to insertion into the mill there is provided a cradle 171 having a bottom wall 172, outwardly and upwardly extending side walls 173, 173 and downwardly tapering outer and inner edges 174 and 175 respectively. The lower surface of the bottom wall 172 of the cradle is secured to a pair of depending plates 176, 176, which in turn are secured to a channel member 177. The channel member 177 is fixed to the lower surface of bottom wall 10 of the lower housing assembly so as to align the leading edge of the screen with opening 13 in end wall 8' of said assembly.

As a means of guiding the screen into the opening 13 there is provided a screen guide assembly consisting of a pair of outer screen guides 178, 178 and a pair of inner screen guides 179, 179 secured to supporting arms 180, 180.

The screen guide assembly assures that proper contact is made between members 36—36 of the screen and slot or track 14 of the lower housing of the mill, which in turn assures that the screen does not contact the hammer tips while entering or being removed from the mill. Outer screen guides 178, 178 also insure correct horizontal alignment of screens while they are entering or being removed from the mill.

To insert the screen into the mill it is held by the operator by means of the two handles 170, 170, then lifted and placed on cradle 171 so that the lower front surface of the screen is allowed to rest near the outer tip or edge 174 of the cradle. The operator holds the rear edge of the screen assembly slightly higher than the front edge, which throws the screen assembly out of a horizontal plane with slot 13 and with the screen in this position he shoves it forward. At this point, inner screen guides 179, 179 make contact on the under side of members 36—36 of the screen and since they are made from spring steel, they lightly grip said screen members. The slight upward tilt of the guides 179, 179 insures that members 36—36 slide into tracks 14 (Figure 5).

After the screen assembly is inserted into the mill to a point where grooves 92—92 in cams 91 and 98 will engage rollers 35, the operator applies pressure to handle 99, which moves bell crank 100, cam 98, tie rod 95 and cam 91, engaging rollers 35, thereby locking the screen in position in the mill under pressure. To remove a screen, the procedure is merely reversed.

*Cable operated screen change mechanism*

As previously mentioned, the screens may be interchangeably inserted into and ejected from the mill by means of cables operated and controlled from a point remote from the mill, as for example from the floor above the mill location.

Referring to Figures 21–24 specifically and Figures 1–12 generally, this modification of the invention includes a control station W, comprising a frame 200 having vertical channel-like legs 201, 201, each of which is secured at its lower end to floor plates 202, 202. A drum box 203, having a front wall 204, side walls 205, 205, and a rear wall 206 is bolted to each of the legs 201 at their upper ends. A horizontal beam 207 is secured to the legs 201 substantially medially thereof for the purpose of supporting a plurality of cable directing pulleys.

Referring particularly to Figure 23, the drum box 203 supports a pair of independently mounted rotatable drums 208, 209, controlled by means of worm shafts 210, 211 respectively, with related worm gears 212, 213 secured to each of said drums. Shaft 210 is actuated by means of a crank handle 214 whereas shaft 211 is actuated by crank handle 215.

Drum 208 controls moving of the screens from the aligned screen rack into the mill for the grinding operation and moving the screen out of the mill and back to the screen rack when it is desired to change screens. Two cables 216, 217 are attached at one of their ends to drum 208 and their other ends are attached to means for dragging the selected screen into and out of the mill. Cable 216 is the "in" cable and cable 217 is the "out" cable As a means for locking the drum 208, a toothed disc 218 is secured to that end of worm shaft 210 which projects beyond the front wall 204 of the control station.

A horizontally disposed spring arm 219, normally biased away from the disc 218, is fixed at one end to the front wall 204 above the disc 218 and at its other end is provided with a plurality of teeth 220 adapted to engage the teeth of said disc. Teeth 220 are brought into engagement with disc 218 by means of a pivotally mounted, cam faced lever 221 secured to the front wall 204. Figure 21 illustrates the lever in unlocked position. To lock teeth 220 with disc 218, lever 221 is pivoted approximately 45°, to a vertical position, thereby forcing arm 219 to move downwardly.

*Up and down movement of screen rack*

The up and down movement of the screen rack E is controlled by means of drum 209, which has one end of a cable 222 attached thereto, the other end of the cable being connected to the top of screen rack E in a manner similar to that shown at 56 in Figure 3. Since the operator at the control station is on a different floor from the mill and thus cannot see the operation, means are provided at the station to enable the operator to determine the relative vertical position of the rack and properly align the individual selected screen with the opening in the side of the mill. This screen aligning means comprises a stationary, vertically disposed rod 223, fixed to the rear wall 206 of the control station, and having a plurality of markers 224 located at predetermined points thereon. A movable rod 225 is slidably mounted on rear wall 206 in side by side relationship to rod 223 and has at its upper end a single marker 226 similar to markers 224. The lower end of rod 225 is provided with a yoke 227 (Figure 23) which is secured to cable 222 so that vertical movement of said cable imparts a corresponding movement to rod 225. Thus, by lining up marker 226 with one of the markers 224, the operator can easily determine if the selected screen is in proper position.

In order to lock the screen rack in the desired position, there is provided a spring biased, substantially L-shaped latch 228 secured to a horizontally disposed rod 229 rotatably mounted in bearing blocks 230, 230 attached to corner posts 40 of the screen rack frame. Said latch 228 is provided with a horizontal leg **228*a* and a vertical leg 228*b* depending therefrom. The leg 228*b* is provided with an inturned tongue 228*c*. A spring metal bar 231 is welded or otherwise secured to one end of rod 229 at a right angle thereto and abuts adjacent corner post 40, tending to urge latch 228 inwardly towards the screen rack to locking position. The keeper means for latch 228 comprises a vertically disposed bar 232 having a plurality of outwardly facing notches 233 corresponding in number to the number of screens carried by the screen rack and adapted to receive tongue 228*c* of said latch. The inner surface of bar 232 is secured to side plate 50** of the screen rack.

As previously mentioned, latch 228 is normally urged inwardly to locking position by spring bar 231. The unlocking of the latch 228 is accomplished by means of a cable 234 attached at its lower end to the outer end of leg **228*a*, the cable then passing over a series of pulleys directing it upwardly towards the control station W. The upper end of the cable is secured to one end of a turnbuckle 235 (Figure 22). Connected to the other end of said turnbuckle is a threaded rod 236 which has its opposite end pivotally secured to a toggle member 237. Said toggle member is pivotally attached to bracket 238 which is secured to rear wall 206 of drum box 203. A lever 239 is fixed to toggle member 237. Figure 22 illustrates the latch control mechanism in its unlocked position. To lock the screen rack in the desired position, the operator moves lever 239 away from him, which causes toggle member 237 to pivot away from rear wall 206, thus lowering rod 236 and cable 234. This will allow spring bar 231 acting on rod 229 to urge tongue 228*c* into the selected notch 233** thereby securing the screen rack in proper vertical alignment for insertion or withdrawal of the desired screen.

*Movement of screens into and out of the mill*

After the selected screen has been positioned opposite groove 13 in the side of the mill, the T-shaped head 34 of the screen injector bar 33 is properly aligned within claw shaped head 81 of screen drag bar 80. The operator turns lever 221 to the right approximately 45° to disengage teeth 220 on spring arm 219 from the toothed disc 218 thereby freeing drum 208 for rotational movement.

As previously mentioned, drum 208 has fixed thereto two cables 216 and 217, separately connected to said drum so that each cable will be wound in opposite directions when the drum is rotated. Both cables depend from the drum and pass around a plurality of pulleys mounted on beam 207 of the control station W and extend downwardly to a pair of adjacent, vertically disposed pulleys 240, 240, secured to the screen rack frame D opposite the screen actuating mechanism B. After passing around pulleys 240, 240, the cables are directed to another pair of pulleys 241, 242. Pulley 241 is mounted on a bracket 243 secured to the front wall 73 of housing H, whereas pulley 242 is mounted on a bracket 244 secured to the rear wall 72 of said housing. Thus the vertical axes of said pulleys are offset from each other for a purpose to be described.

The basic structure of housing H illustrated in Figures 15, 15*b* and 15*c* is utilized in the present modification of the invention. However, instead of using the motor driven screw shaft 70 to actuate nut 77, cables 216 and 217 perform the function of actuating the nut. Referring now to Figure 24, it will be seen that cable 216 passes around pulley 241, enters housing H and has its end secured in a cable clamp 245 contained within nut 77. Cable 217 passes around pulley 242 and proceeds along the outside of rear wall 72 to the end of the housing where it passes around another pulley 246 and then enters the housing through an opening 247. The end of cable 217 is then connected to cable clamp 245.

With the selected screen in position to enter the mill, and after moving lever 221 to release disc 218, the operator turns crank handle 214 in a clockwise direction. This causes drum 208 to rotate and wind cable 217 thereabout. Since cable 216 is wrapped around the drum in an opposite direction to that of cable 217, cable 216 will move downwardly as cable 217 moves upwardly. As previously mentioned, both cables are secured to nut 77 by means of clamp 245, therefore as nut 77 begins to move inwardly, or to the right in Figure 24, roller 79 moves upwardly in groove 76 on front wall 73 of housing H, moving coupling bar 78 into notch 83 in drag bar 80. The upward movement of coupling bar 78 displaces spring pressed key 132 from notch 83 thus freeing drag bar 80 for movement.

With the drag bar 80 connected to nut 77 through coupling bar 78, continued movement of nut 77 towards the right will cause the selected screen to be drawn into the mill.

After the screen is within approximately 13/32" of complete inward travel, roller 79 moves downwardly in groove 76 (shown in dotted lines in Figure 24) which causes coupling bar 78 to drop out of notch 83 of drag bar 80, thus releasing said drag bar from engagement with nut 77. Spring pressed key 130 then enters notch 83 to lock drag bar 80 against further movement. As coupling bar 78 moves downwardly it displaces spring pressed key 152 from notch 87 of clamping bar 85, thus the clamping bar to nut 77. Continued movement of said nut causes clamping bar 85 to move with it, which movement causes roller 86 on the opposite end of clamping bar 85 to ride in groove 89 of drum 88 and rotate the latter, thus rotating cams 91 and 98 through members 90, 93, 94, 95, 96, and 97 (Figure 10). The screen is now securely locked in the mill. As nut 77 and clamping bar 85 continue to travel to the right, bar 85 abuts stop 248 located in groove 75 in front wall 73 of housing H. Just prior to this abutment, the operator will detect an increase in load on crank handle 214 due to the locking operation just described. As the increase in load becomes apparent, the operator aligns a lug 249 (Figure 23) secured to the rim of drum 208 with the top surface of front wall 204 of the control station. He then moves lever 221 to the left forcing teeth 220 on spring arm 219 to engage the teeth of disc 218 which locks crank handle 214 in position. To remove the screen from the mill the foregoing procedure is reversed.

I claim:

1. A hammer mill, comprising, in combination, a housing having upper and lower portions, said upper portion having a material receiving inlet opening, said lower portion having a material discharge opening, and a screen receiving opening therein, a grinding chamber within said housing, a rotatably driven shaft disposed within said chamber, a plurality of rows of hammer members secured to said shaft, an arcuate screen removably disposed in said chamber within the path of travel of said hammer members, a rack for storing a plurality of horizontally disposed screens in stacked vertical relationship adjacent the side of the housing having said screen receiving opening, elevating means for raising and lowering said rack, screen aligning means to position a selected screen in alignment with said screen receiving opening, reversible screen actuating means for moving a screen from said rack into said grinding chamber and withdrawing the screen therefrom and returning it to storage position in said rack, releasable clamping means secured to said housing adjacent said screen receiving opening to lock the selected screen in the grinding chamber, said clamping means alternately and operatively connected to said screen actuating means for automatically locking and unlocking said screen when it is inserted into and withdrawn from the grinding chamber.

2. A hammer mill according to claim 1 wherein the upper portion of said housing is pivotally connected to said lower portion and is provided with means within said inlet opening for retarding the throw-out of ground material from the grinding chamber.

3. A hammer mill according to claim 1 wherein said upper housing is provided with an opening communicating with said grinding chamber to provide a supplemental source of air supply to said chamber.

4. A hammer mill according to claim 1 including means associated with at least one of said rows of hammer members to create a suction into the grinding chamber around said driven shaft thereby eliminating leakage of material from the grinding chamber through the shaft opening in said housing.

5. In combination with a hammer mill having a housing provided with a screen opening and a grinding chamber, a plurality of interchangeable screens for insertion into said chamber, screen actuating means for inserting and ejecting a selected screen into and out of said chamber, reversible drive means connected to said screen actuating means, clamping means for locking and unlocking said screen in said chamber, said clamping means secured to said housing adjacent said screen opening, and means carried by said reversible drive means for operating said screen actuating means and said screen clamping means in pre-determined relationship to each other.

6. A hammer mill comprising, in combination, a housing having a screen receiving opening communicating with a grinding chamber, a frame adjacent said opening, a screen storage rack supported in the frame and vertically movable in relation to said screen receiving opening, a plurality of screens carried by said rack, means for raising and lowering said rack, means for selectively positioning a screen opposite said opening, a casing disposed beneath said chamber and adjacent said rack, screen actuating means within said casing and adapted to move a selected screen horizontally into and out of said chamber, reversible drive means connected to said screen actuating means, releasable screen clamping means carried by said housing to lock and unlock the selected screen in said grinding chamber, and means carried by said reversible drive means for operating said screen actuating means and said screen clamping means in predetermined relationship to each other.

7. A hammer mill according to claim 6, wherein said means for raising and lowering said screen rack comprises, a cable having one end connected to said rack and its other end connected to a yoke member, means connecting said yoke member to an internally threaded nut, a screw shaft on which said nut is mounted and motor driven means for operating said screw shaft.

8. A hammer mill according to claim 6 wherein said means for selectively positioning a screen opposite said opening comprises, a limit switch mounted on said frame, a plurality of vertically arranged trip lugs carried by said screen storage rack adjacent to and in the path of said limit switch, said lugs corresponding in number to the number of screens stored in said rack and cooperating with said limit switch to stop the selected screen in the desired position opposite said screen receiving opening.

9. A hammer mill according to claim 6, wherein, said reversible drive means comprises an electrically controlled motor driven screw shaft.

10. A hammer mill comprising, in combination, a housing having a screen receiving opening communicating with a grinding chamber, a frame adjacent said opening, a screen storage rack supported in the frame and vertically movable in relation to said screen receiving opening, a plurality of screens carried by said rack, a control station located at a point remote from said hammer mill, means for raising and lowering said rack, said means including a cable having one end secured to said rack and its other end attached to a manualy operated rotatable drum mounted in said control station, means for selectively positioning a screen opposite said opening, screen actuating means disposed beneath said chamber and adjacent said rack to move a selected screen horizontally into and out of said chamber, reversible drive means connected to said screen actuating means, releasable screen clamping means carried by said housing to lock and unlock the selected screen in said grinding chamber, and means carried by said reversible drive means for operating said screen actuating means and said screen clamping means in predetermined relationship to each other.

11. A hammer mill according to claim 10 wherein said means for selectively positioning a screen opposite said opening comprises, a fixed rod and a movable rod each mounted vertically in side by side relationship adjacent said rotatable drum at the control station, said fixed rod having a plurality of markers thereon corresponding in number to the number of screens in said screen rack, said movable rod having a single marker at its upper end, the lower end of said movable rod connected to said cable whereby vertical movement of said cable through rotation of said drum imparts corresponding vertical movement to said rod thus indicating the relative position of the individual screens in said screen rack to said screen receiving opening.

12. A hammer mill according to claim 10 wherein said reversible drive means comprises a pair of cables and means for manually controlling the same.

13. A hammer mill comprising, in combination, a housing having a screen receiving opening communicating with a grinding chamber, a frame adjacent said opening, a screen storage rack supported in said frame and vertically movable in relation to said screen receiving opening, a plurality of screens carried by said rack, each of said raising and lowering said rack, means for selectively positioning a screen opposite said opening, a casing disposed beneath said chamber and adjacent said rack, said casing having top, rear and front walls, a screen drag member slidably disposed within said casing and having means at one end thereof adapted to engage said screen draw bar, coupling means releasably connected to said screen drag member and slidably disposed within said casing and reversible drive means connected to said coupling means to impart longitudinal movement thereto and move the engaged screen into and out of the grinding chamber.

14. The combination according to claim 13, wherein, said screen drag member comprises a substantially flat body having a notch in one edge thereof, and a claw-shaped head at one end of said body.

15. The combination according to claim 13, wherein the front and rear walls of said casing are provided with oppositely disposed and aligned grooves within which said screen drag member is mounted, the front wall of said casing having a stepped track therein.

16. The combination according to claim 15, wherein said coupling means includes a vertically movable bar having a roller on one side thereof, said roller adapted to ride in said stepped track.

17. A hammer mill comprising, in combination, a housing having a screen receiving opening communicating with a grinding chamber, a frame adjacent said opening, a screen storage rack supported in said frame and vertically movable in relation to said screen receiving opening, a plurality of screens carried by said rack, each of said screens having a draw bar secured thereto, means for raising and lowering said rack, means for selectively positioning a screen opposite said opening, a casing disposed beneath and chamber and adjacent said rack, said casing having top, rear and front walls, a screen drag member slidably disposed within said casing and having means at one end thereof adapted to engage said screen draw bar, coupling means releasably connected to said screen drag member and slidably disposed within said casing, reversible drive means connected to said coupling means to impart longitudinal movement thereto and move the engaged screen into and out of the grinding chamber, releasable screen clamping means carried by said said housing to lock and unlock the selected screen in the grinding chamber, said screen clamping means including camming means secured to said casing adjacent said screen receiving opening, means connecting said camming means to a rotatable member beneath said screen receiving opening, means for rotating said rotatable member, said last mentioned means operated by said coupling means.

18. A hammer mill comprising, in combination, a housing provided with a grinding chamber having an arcuate shaped opening, an arcuate screen insertable in said opening, said screen having longitudinal rails along its upper edges, a screen supporting cradle member secured to said housing beneath the lower edge of said opening, inner and outer guide means secured to each side of said housing adjacent the terminal portions of said opening, said inner guide means comprising a pair of angularly disposed outwardly projecting spring arms adapted to engage said rails and insure proper insertion of the screen into the grinding chamber.

References Cited in the file of this patent

UNITED STATES PATENTS

| | | |
|---|---|---|
| 2,227,090 | Hughes | Dec. 31, 1940 |
| 2,661,159 | Thomas | Dec. 1, 1953 |
| 2,669,396 | Nickle | Feb. 16, 1954 |
| 2,732,137 | Fisher | Jan. 24, 1956 |
| 2,823,869 | Reese | Feb. 18, 1958 |